US011828361B2

(12) United States Patent
Piracha

(10) Patent No.: US 11,828,361 B2
(45) Date of Patent: Nov. 28, 2023

(54) METHOD FOR DETERMINING A DRAG TORQUE COEFFICIENT

(71) Applicant: Ningbo Geely Automobile Research & Development Co., Ltd., Ningbo (CN)

(72) Inventor: Muddassar Piracha, Gothenburg (SE)

(73) Assignee: NINGBO GEELY AUTOMOBILE RESEARCH & DEVELOPMENT CO., LTD.

( * ) Notice: Subject to any disclaimer, the term of this patent is extended or adjusted under 35 U.S.C. 154(b) by 0 days.

(21) Appl. No.: 17/727,485

(22) Filed: Apr. 22, 2022

(65) Prior Publication Data
US 2022/0243806 A1 Aug. 4, 2022

Related U.S. Application Data

(63) Continuation of application No. PCT/CN2020/119504, filed on Sep. 30, 2020.

(30) Foreign Application Priority Data

Nov. 1, 2019 (EP) .................................... 19206732

(51) Int. Cl.
*F16H 61/02* (2006.01)
*F16H 61/04* (2006.01)
(Continued)

(52) U.S. Cl.
CPC ......... *F16H 61/0403* (2013.01); *F16H 59/14* (2013.01); *F16H 59/36* (2013.01);
(Continued)

(58) Field of Classification Search
CPC ...... F16H 61/0403; F16H 59/14; F16H 59/36; F16H 61/0204; F16H 2061/009; F16H 2061/0093; B60Y 2200/92; B60K 6/36
See application file for complete search history.

(56) References Cited

U.S. PATENT DOCUMENTS

2011/0125378 A1   5/2011   Blessing
2018/0112770 A1   4/2018   Hansson

FOREIGN PATENT DOCUMENTS

CN   104340229 A   2/2015
CN   106335501 A   1/2017
(Continued)

OTHER PUBLICATIONS

International Search Report from corresponding International Application No. PCT/CN2020/119504, dated Dec. 31, 2020, 2 pages.
(Continued)

*Primary Examiner* — Tisha D Lewis
(74) *Attorney, Agent, or Firm* — Tucker Ellis LLP

(57) ABSTRACT

A method for determining a drag torque coefficient of a transmission includes performing rotational speed synchronisation involving application of synchronisation torque to a first transmission component, and obtaining an initial rotational speed of the first transmission component before the rotational speed synchronisation, and a final rotational speed of the first transmission component after the rotational speed synchronisation, and time period for performing the rotational speed synchronisation. Also, obtaining information relating to a level of the synchronisation torque applied to the first transmission component during the rotational speed synchronisation, and information relating to a total moment of inertia associated with the first transmission component. In addition, determining the drag torque coefficient based on the obtained initial rotational speed, the obtained final rotational speed, the obtained time period, the level of the applied synchronisation torque and the total moment of inertia associated with the first transmission component.

18 Claims, 7 Drawing Sheets

(51) Int. Cl.
*F16H 59/14* (2006.01)
*F16H 59/36* (2006.01)
*B60K 6/36* (2007.10)
*F16H 61/00* (2006.01)

(52) U.S. Cl.
CPC ............ *F16H 61/0204* (2013.01); *B60K 6/36* (2013.01); *B60Y 2200/92* (2013.01); *F16H 2061/009* (2013.01)

(56) References Cited

FOREIGN PATENT DOCUMENTS

| CN | 107117157 A | 9/2017 | |
| CN | 107133421 A | * 9/2017 | ......... G06F 17/5009 |
| CN | 107246472 A | 10/2017 | |
| CN | 109203988 A | 1/2019 | |
| DE | 102011016576 A1 | 10/2012 | |
| EP | 1067008 B1 | 1/2001 | |
| EP | 2336604 A1 | 6/2011 | |
| EP | 3473894 A1 | 4/2019 | |
| JP | 4586929 B1 | 11/2010 | |
| JP | 2017145845 A | 8/2017 | |
| WO | 2018215523 A1 | 11/2018 | |

OTHER PUBLICATIONS

Keerthi Medleri, et al., "Drag Torque and Synchronization Modelling in a Dual Clutch Transmission," Master Thesis, Jun. 12, 2018, 76 pages.

Clemens Schlegel, et al., "Detailed Loss Modelling of Vehicle Gearboxes," Proceedings 7th Modelica Conference, Sep. 20-22, 2009, 10 pages.

* cited by examiner

METHOD FOR DETERMINING A DRAG TORQUE COEFFICIENT

RELATED APPLICATION DATA

This application is a continuation of International Patent Application No. PCT/CN2020/119504, filed Sep. 30, 2020, which claims the benefit of European Patent Application No. 19206732.0, filed Nov. 1, 2019, the disclosures of which are incorporated herein by reference in their entireties.

TECHNICAL FIELD

The present disclosure relates to a method for determining a drag torque coefficient of a transmission. The disclosure further relates to a corresponding transmission system.

The method and transmission system according to the disclosure can for example be arranged in a vehicle. However, although the disclosure will be described primarily in relation to a car, the disclosure is not restricted to this particular vehicle, but may as well be installed in another type of vehicle, such as a truck, a bus, an off-road vehicle, a mining vehicle, an agriculture vehicle, a working vehicle, a marine vessel, a motorcycle, or the like. In addition, the method and transmission system according to the disclosure can also be arranged in stationary transmission equipment, such as various industry applications, wind generator applications, or the like.

BACKGROUND

In the field of automatic transmissions, such as automatic stepped gear vehicle transmission, there is demand for performing faster, smoother and more silent gear shifts.

The high-level gear shifting process can for example be divided into following phases:
1. Torque ramp down
2. Sleeve to Neutral
3. Speed Synchronization
4. Sleeve to Gear Engagement
5. Torque Ramp up.

The quality of gear shift as perceived by driver depends on various factors, such as for example the gear shift time taken from torque ramp down to torque ramp up and noise caused by the gear shifting process. Moreover, the overall reliability and life span of the transmission is also an important quality factor for the driver.

Various methods for controlling parameters such as synchronisation torque and dog clutch shifting actuator have been developed for providing faster, smoother and more silent gear shifts, but despite the activities in the field, there is still a demand for an even further improved gear shift control, which is capable of meeting the requirements with respect to faster, smoother and more silent gear shifts.

SUMMARY

An object of the present disclosure is to provide a method for determining a drag torque coefficient of a transmission where the previously mentioned problems are avoided.

According to a first aspect of the present disclosure, there is provided a method for determining a drag torque coefficient of a transmission, the method comprises performing rotational speed synchronisation involving application of synchronisation torque to a first transmission component, and obtaining an initial rotational speed of the first transmission component before the rotational speed synchronisation, a final rotational speed of the first transmission component after the rotational speed synchronisation, and time period for performing the rotational speed synchronisation. The method further comprises obtaining information relating to a level of the synchronisation torque applied to the first transmission component during the rotational speed synchronisation, and obtaining information relating to a total moment of inertia associated with the first transmission component. Finally, the method comprises determining the drag torque coefficient based on the obtained initial rotational speed, the obtained final rotational speed, the obtained time period, the level of the applied synchronisation torque and the total moment of inertia associated with the first transmission component.

According to a second aspect of the present disclosure, there is provided a transmission system comprising an electronic control unit and a transmission including a first rotatable transmission component, wherein the electronic control unit is configured for, upon performing a rotational speed synchronisation involving application of synchronisation torque to the first transmission component: obtaining an initial rotational speed of the first transmission component before the rotational speed synchronisation, a final rotational speed of the first transmission component after the rotational speed synchronisation, and a time period for performing the rotational speed synchronisation. The electronic control unit is additionally configured for obtaining information relating to a level of the synchronisation torque applied to the first transmission component during the rotational speed synchronisation, and obtaining information relating to a total moment of inertia associated with the first transmission component. The electronic control unit is further configured for determining the drag torque coefficient based on the obtained initial rotational speed, the obtained final rotational speed, the obtained time period, the level of the applied synchronisation torque and the total moment of inertia associated with the first transmission component.

In this way, it becomes possible to obtain an accurate value of the current drag torque coefficient without having to perform any specially adapted operating routine of the transmission, such as allowing a freewheeling transmission component of the transmission to slowly decelerate without influence of synchronisation torque, i.e. merely caused to decelerate due to drag torque, for identifying the drag torque coefficient.

Such specially adapted operating routines are often not compatible with normal operating conditions of the transmission, and must thus either be performed relatively seldom operating conditions that allow for such slow deceleration of a freewheeling transmission component to be performed unnoticed by the driver, thus providing only sporadic data of the drag torque coefficient, or the driver must accept frequent undesirable interference in the normal driving behaviour caused by the transmission performing a slow freewheeling deceleration of the transmission component.

In other words, the present method and system according to the present disclosure enables frequent identification of current drag torque coefficient, and also mapping of drag torque coefficient as a function of transmission operating temperature, such that fast, smooth and silent gearshifts may be performed. The large amount of data concerning drag torque coefficient for various operating conditions also enables other functionalities, such as well-founded advice concerning transmission and/or power train maintenance needs, transmission lubrication oil status, transmission roller bearing status, etc.

Moreover, the process for identification of the drag torque coefficient may be performed unnoticed by the driver and does not affect the driving behaviour of the vehicle.

Further advantages are achieved by implementing one or several additional aspects of the disclosure.

In some example embodiments, the step of determining the drag torque coefficient based on the obtained initial rotational speed, the obtained final rotational speed, the obtained time period, the level of the applied synchronisation torque and the total moment of inertia associated with the first transmission component, is performed after the gear shifting process including the rotational speed synchronisation has been finalized. Thereby, since the execution of the search algorithm for actually identifying the drag torque coefficient based on the detected and obtained data from the gear shifting event may be performed virtually at any time, said execution may be performed offline at a suitable time point of low, either by the transmission controller or some other CPU having computational power available.

In some example embodiments, the step of determining the drag torque involves using an equation having as terms the drag torque coefficient, the initial rotational speed of the first transmission component before the rotational speed synchronisation, the final rotational speed of the first transmission component after the rotational speed synchronisation, the time period for performing the rotational speed synchronisation, the level of applied synchronisation torque and total moment of inertia associated with the first transmission component. Thereby, the main parameters describing the synchronisation process is taken into account when determining the drag torque coefficient, such that the drag torque coefficient may be determined with high accuracy.

In some example embodiments, the step of determining the drag torque coefficient involves applying a Search Algorithm, in particular a Binary Search Algorithm, for identifying the drag torque coefficient. Thereby, the drag torque coefficient may be quickly determined with high accuracy without need for high computational or memory resources.

In some example embodiments, applying the Binary Search Algorithm involves: a first step of setting a value of the drag torque coefficient equal to an initial drag torque coefficient value; a second step of calculating a value of one of terms: the initial rotational speed of the first transmission component, the final rotational speed of the first transmission component, the time period for performing the rotational speed synchronisation, the level of synchronisation torque, and the total moment of inertia associated with the first transmission component, based on an equation having as terms the drag torque coefficient, initial rotational speed of the first transmission component, final rotational speed of the first transmission component, time period for performing the rotational speed synchronisation, the obtained level of synchronisation torque and the obtained level of moment of inertia. Moreover, applying the Binary Search Algorithm additionally involves a third step of calculating an error value equal to a difference between the obtained value of said term and the calculated value of said term; a fourth step of comparing the error value with an error margin and terminating the Binary Search Algorithm when the error value is smaller or equal to the error margin; and a fifth step of comparing the obtained value of said term with the calculated value of the said term, adjusting the value of the drag torque coefficient accordingly, and keep repeating the second to fifth steps of the Binary Search Algorithm. The Binary Search Algorithm provides a fast of efficient solution for identifying a drag torque coefficient with a high accuracy.

In some example embodiments, applying the Binary Search Algorithm involves: a first step of setting the drag torque coefficient equal to an initial drag torque coefficient; a second step of calculating a final rotational speed of the first transmission component based on an equation having as terms also the drag torque coefficient, the obtained initial rotational speed of the first transmission component, the obtained time period for performing the rotational speed synchronisation, the obtained level of synchronisation torque and the obtained level of moment of inertia; a third step of calculating an error value equal to a difference between the obtained final rotational speed and the calculated final rotational speed; a fourth step of comparing the error value with an error margin and terminating the Binary Search Algorithm when the error value is smaller or equal to the error margin; and a fifth step of comparing the obtained final rotational speed with the calculated final rotational speed, adjusting the value of the drag torque coefficient accordingly, and keep repeating the second to fifth steps of the Binary Search Algorithm.

By using the parameter "final rotational speed of the first transmission component" for comparing calculated and obtained values, a straightforward solution with an intuitive shape of a the drag torque coefficient as a function of final rotational speed of the first transmission component is provided, and wherein the equation for calculating the final rotational speed of the first transmission component is readily available.

In some example embodiments, the first step additionally includes setting an upper drag torque coefficient limit equal to an initial upper drag torque coefficient limit, setting a lower drag torque coefficient limit equal to an initial lower drag torque coefficient limit, and setting the initial drag torque coefficient within a range defined by the upper and lower drag torque coefficient limits, in particular at a centre of said range defined by the upper and lower drag torque coefficient limits; and the fifth step involves comparing the obtained final rotational speed with the calculated final rotational speed, wherein when the obtained final rotational speed is smaller than the calculated final rotational speed during gear downshift, or when the obtained final rotational speed is larger than the calculated final rotational speed during gear upshift: setting the lower drag torque coefficient limit equal to the drag torque coefficient, and setting the drag torque coefficient equal to centre of range defined by the upper drag torque coefficient limit and the lower drag torque coefficient limit, and keep repeating the second to fifth steps of the Binary Search Algorithm, and wherein when the obtained final rotational speed is larger than the calculated final rotational speed during gear downshift, or when the obtained final rotational speed is smaller than the calculated final rotational speed during gear upshift: setting the upper drag torque coefficient limit equal to the drag torque coefficient, and setting the drag torque coefficient equal to centre of range defined by the upper drag torque coefficient limit and the lower drag torque coefficient limit, and keep repeating the second to fifth steps of the Binary Search Algorithm.

This approach for executing the Binary Search Algorithm involving iterative halving of the range of the drag torque coefficient and subsequent adjustment of the drag torque coefficient to be located in the centre of the new range, results in a fast and efficient identification of the drag torque coefficient having an acceptable error value.

In some example embodiments, calculation of the final rotational speed in the second step of the Binary Search Algorithm is performed using the equation:

$$\omega_{f_{b_{mid}}} = \frac{T}{b_{mid}} + \left[\omega_0 - \frac{T}{b_{mid}}\right] \times e^{-\frac{b_{mid} t_f}{J}},$$

wherein
- $\omega_{f\_b_{mid}}$=calculated final rotational speed
- $\omega_0$=initial rotational speed of the first transmission component
- T=synchronisation torque
- $b_{mid}$=drag torque coefficient
- $t_f$=synchronisation time period
- J=total moment of inertia associated with the first transmission component.

In some example embodiments, applying the Binary Search Algorithm involves: a first step of setting the drag torque coefficient equal to an initial drag torque coefficient; a second step of calculating a time period for performing the rotational speed synchronisation based on an equation having as terms also the drag torque coefficient, the obtained initial rotational speed of the first transmission component, the obtained final rotational speed of the first transmission component, the obtained level of synchronisation torque and the obtained level of moment of inertia; a third step of calculating an error value equal to a difference between the obtained time period for performing the rotational speed synchronisation and the calculated time period for performing the rotational speed synchronisation; a fourth step of comparing the error value with an error margin and terminating the Binary Search Algorithm when the error value is smaller or equal to the error margin; and a fifth step of comparing the obtained time period for performing the rotational speed synchronisation with the calculated time period for performing the rotational speed synchronisation, adjusting the value of the drag torque coefficient accordingly, and keep repeating the second to fifth steps of the Binary Search Algorithm.

By using the parameter "time period for performing the rotational speed synchronisation" for comparing calculated and obtained values, a straightforward solution with an intuitive shape of a the drag torque coefficient as a function of time period for performing the rotational speed synchronisation is provided, and wherein the equation for calculating the time period for performing the rotational speed synchronisation is readily available.

In some example embodiments, the first step additionally includes setting an upper drag torque coefficient limit equal to an initial upper drag torque coefficient limit, setting a lower drag torque coefficient limit equal to an initial lower drag torque coefficient limit, and setting the initial drag torque coefficient within a range defined by the upper and lower drag torque coefficient limits, in particular at a centre of said range defined by the upper and lower drag torque coefficient limits; and the fifth step involves comparing the obtained time period for performing the rotational speed synchronisation with the calculated time period for performing the rotational speed synchronisation, and wherein when the obtained time period for performing the rotational speed synchronisation is smaller than the calculated time period for performing the rotational speed synchronisation during gear downshift, or when the obtained time period for performing the rotational speed synchronisation is larger than the calculated time period for performing the rotational speed synchronisation during gear upshift: setting the lower drag torque coefficient limit equal to the drag torque coefficient, and setting the drag torque coefficient equal to centre of range defined by the upper drag torque coefficient limit and the lower drag torque coefficient limit, and keep repeating the second to fifth steps of the Binary Search Algorithm, and wherein when the obtained time period for performing the rotational speed synchronisation is larger than the calculated time period for performing the rotational speed synchronisation during gear downshift, or when the obtained time period for performing the rotational speed synchronisation is smaller than the calculated time period for performing the rotational speed synchronisation during gear upshift: setting the upper drag torque coefficient limit equal to the drag torque coefficient, and setting the drag torque coefficient equal to centre of range defined by the upper drag torque coefficient limit and the lower drag torque coefficient limit, and keep repeating the second to fifth steps of the Binary Search Algorithm.

This approach for executing the Binary Search Algorithm involving iterative halving of the range of the drag torque coefficient and subsequent adjustment of the drag torque coefficient to be located in the centre of the new range, results in a fast and efficient identification of the drag torque coefficient having an acceptable error value.

In some example embodiments, calculation of the time period in the second step of the Binary Search Algorithm is performed using the equation:

$$t_{f\_b_{mid}} = \frac{-J}{b_{mid}} \times \ln\left[\frac{\omega_f - \frac{T}{b_{mid}}}{\omega_0 - \frac{T}{b_{mid}}}\right],$$

wherein
- $t_{f\_b_{mid}}$=calculated time period for performing the synchronisation
- $\omega_0$=initial rotational speed of the first transmission component
- T=synchronisation torque
- $b_{mid}$=drag torque coefficient
- $\omega_f$=final rotational speed of the first transmission component
- J=total moment of inertia associated with the first transmission component.

In some example embodiments, the method comprises setting the initial upper drag torque coefficient limit equal to synchronisation torque divided by obtained final rotational speed, and setting the initial lower drag torque coefficient limit equal to nil. Thereby, the entire feasible range of the drag torque coefficient is covered, such that the algorithm with certainty may converge towards a drag torque coefficient with low error value.

The present disclosure also relates to a method for controlling a rotational speed synchronisation of a transmission, wherein the method comprises: determining a drag torque coefficient of the transmission during a first rotational speed synchronisation as described above; calibrating a transmission control software based on the determined drag torque coefficient; and controlling a subsequent second rotational speed synchronisation of the transmission by means of the calibrated transmission control software. Thereby, the actual implementation and use of the newly identified drag torque coefficient may be performed in a straightforward and efficient manner.

The present disclosure also relates to an electronic control unit comprising a processor configured to perform the method as described above.

The present disclosure also relates to a computer program comprising instructions which, when the program is executed by a computer, cause the computer to carry out the method as described above.

The present disclosure also relates to a computer-readable storage medium comprising instructions which, when executed by a computer, cause the computer to carry out the method as described above.

In some example embodiments, the transmission is a stepped gear transmission including a plurality of driving gears.

The present disclosure also relates to a drive train for a hybrid electric or electric vehicle, the drive train comprising the transmission system as descried above, and an electric propulsion motor drivingly connected with the transmission.

The present disclosure also relates to a vehicle comprising a data processing control unit, or the transmission system, or a drive train as described above.

Further features and advantages of the invention will become apparent when studying the appended claims and the following description. The skilled person in the art realizes that different features of the present disclosure may be combined to create embodiments other than those explicitly described hereinabove and below, without departing from the scope of the present disclosure.

BRIEF DESCRIPTION OF THE DRAWINGS

The disclosure will be described in detail in the following, with reference to the attached drawings, in which.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

This disclosure relates to a method for determining a drag torque coefficient of a transmission. Thereby, it is possible to use and implement improved control of the various components that are relevant for providing a fast, smooth and silent gear shift in a transmission, because with knowledge of the drag torque coefficient, the resulting rotational acceleration of the transmission component that shall to be rotationally speed synchronised with another transmission component, upon applying a certain known synchronisation torque, can be more accurately estimated.

In other words, if for example a transmission controller is provided with a control strategy that calculates a suitable time point for starting the synchronisation time period and/or a suitable relative rotational position of the two transmission components to the synchronised at the start of the synchronisation time period, that taking into account a known applied synchronisation torque results in a desired alignment of the dog teeth of said two transmission components directly upon reaching the synchronised rotational speed, such that immediate virtually interference-free gear engagement is possible upon reaching said synchronised rotational speed, knowledge of the current drag torque coefficient is valuable because it enables further improved accuracy of the calculation of said time point and/or relative starting position, thereby providing even faster, smoother and more silent gear engagements.

Figure 1:
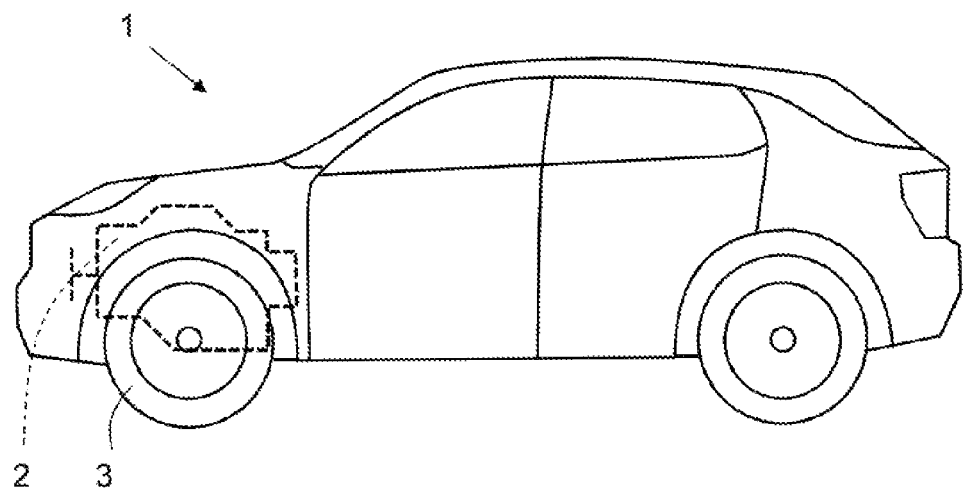
FIG. 1 shows schematically a vehicle having a transmission.

For describing the method of determining a drag torque coefficient of a transmission in a context, reference is first made to FIG. 1, which shows an example embodiment of a car 1 having propulsion power source 2, such as internal combustion engine and/or an electric motor, drivingly connected with driving wheels 3 of the car via a multi-gear transmission, i.e. a transmission with a plurality of discrete gears, wherein each gear has a unique gear ratio. Clearly, the method according to the disclosure is not limited to a transmission for a front wheel driven car, or even a car at all, but may advantageously be implemented in many other types of multi-step transmissions and in many other types of applications.

Figure 2A:
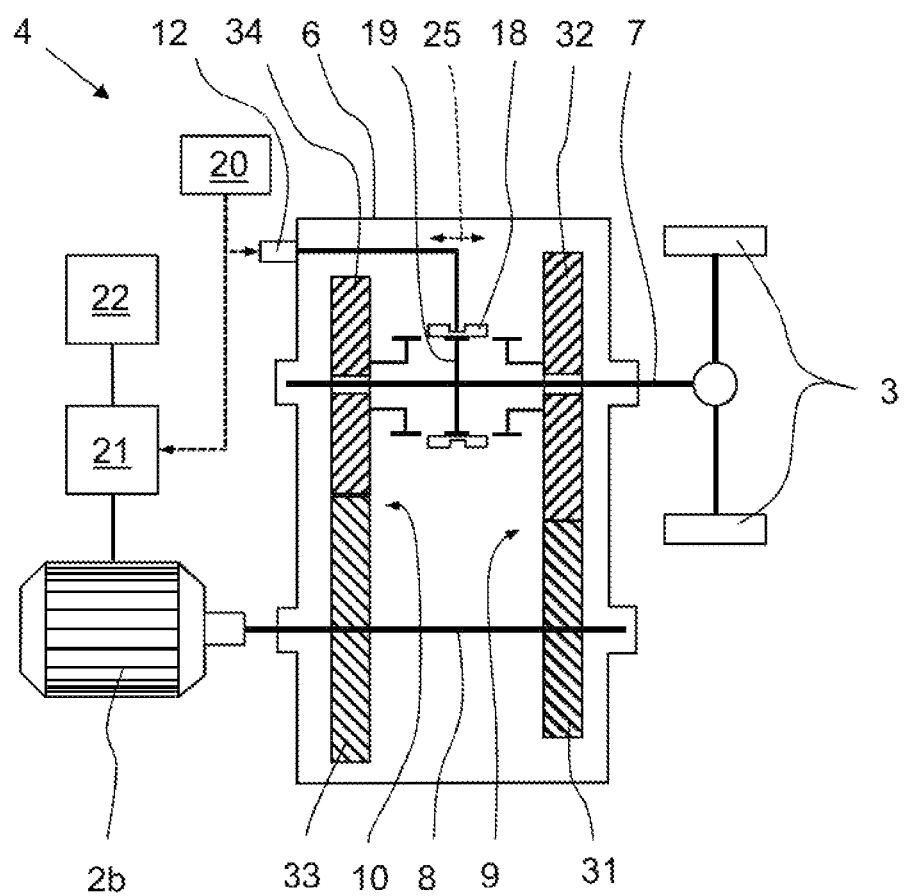
FIG. 2A-2C show schematically three different example embodiments of a drive train including a transmission.

FIG. 2A shows a schematic illustration of a two-gear transmission 6 of a drive train 4 of automated manual transmission ATM. The drive train comprises an electric motor 2b as propulsion source, a transmission 6 and a set of driving wheel 3. The transmission according to this example embodiment has a main drive shaft 7, an input drive shaft 8, a constant mesh first gear 9 having a first gear ratio, a constant mesh second gear 10 having a second gear ratio.

The first gear 9 includes a first gear 31 rotationally secured to the input shaft 8 and in constant mesh with a freewheeling second gear wheel 32 arranged on, and rotatable relative to, said main shaft 7, and the second gear 10 includes a third gear 33 that is rotationally secured to the input shaft 8 and in constant mesh with a freewheeling fourth gear wheel 34 that is arranged on, and rotatable relative to, said main shaft 7.

An axially displaceable shift sleeve 18 arranged on and rotationally secured to the main shaft 7 via a hub 19 comprises a set of sleeve teeth, also referred to as dog teeth or simply dogs, which may be axially shifted by in both directions along a shift direction 25 by means of a shifting actuator 12 for engaging corresponding teeth, dog teeth or simply dogs of any of the associated second and fourth gear wheels 32, 34 of the first and second constant mesh gears 9, 10, for selectively changing the total gear ratio between the input shaft 8 and main shaft 7.

Figure 2B:
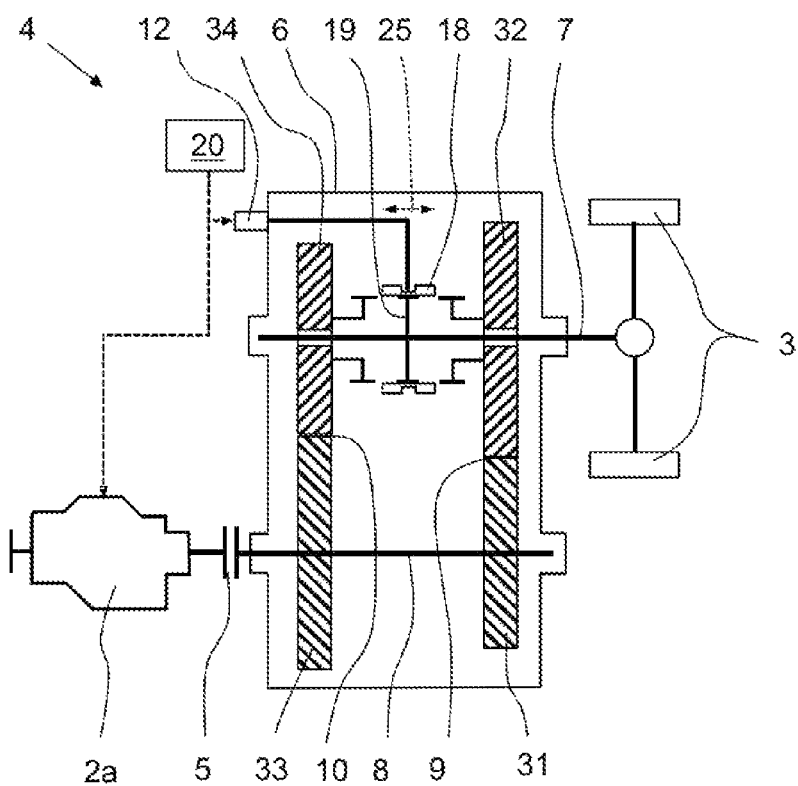
Figure 2C:
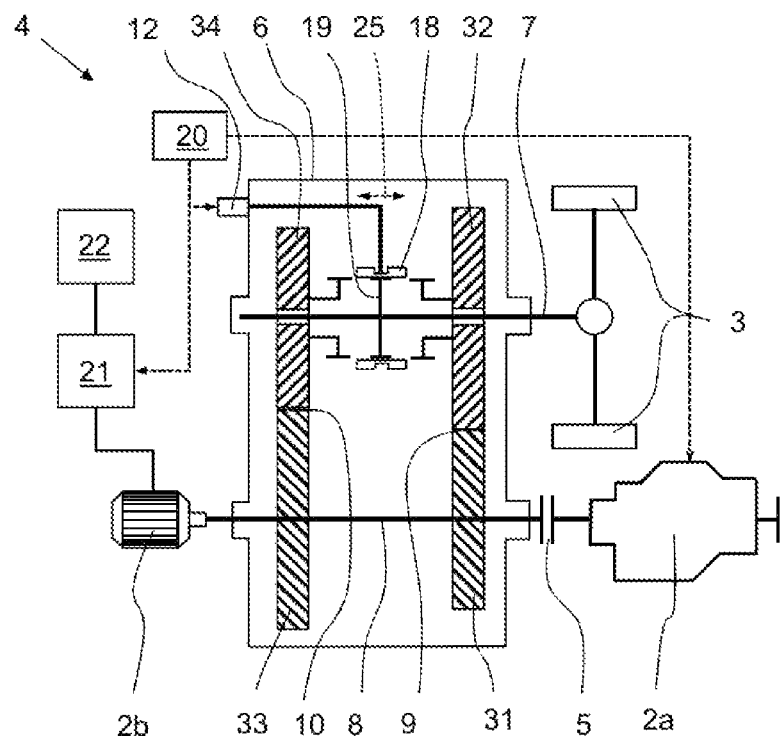
Figure 2D:
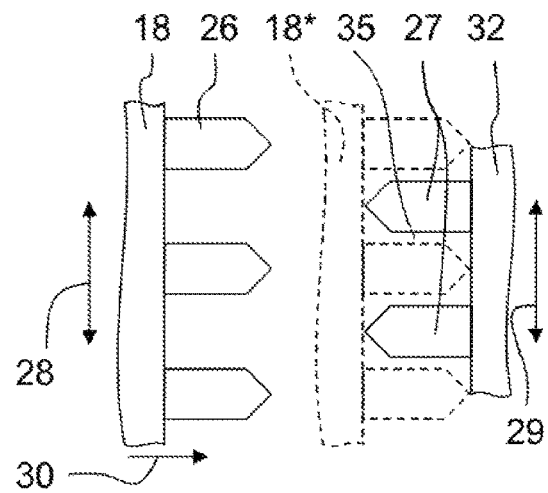
FIG. 2D shows schematically a matching position of sleeve teeth and gear teeth.

FIG. 2D schematically illustrates an example embodiment of the shift sleeve 18 with a set of sleeve teeth 26, and the second gear wheel 32 with a set of corresponding teeth 27, in a disengaged state. Upon rotation of the shift sleeve 18, the sleeve teeth 26 move in a circumferential direction 28 of the shift sleeve, and upon rotation of the second gear wheel 32, the corresponding teeth 27 move in a circumferential direction 29 of the second gear wheel 32. The shift sleeve 18 is axially displaceable in the axial direction 30, such that the sleeve teeth 26 may enter into recesses 35 defined by neighbouring corresponding teeth 27 of the second gear wheel 32, as illustrated by the shift sleeve 18* in an engaged state by a dotted line.

An electronic controller 20, such as a transmission controller, is provided for controlling operation of the transmission 6, in particular operation of the shifting actuator 12. The same controller 20 may, as illustrated I FIG. 2, also be arranged to control operation of an electric power converter 21, such as for example an inverter, that is arranged for controlling the voltage and current supplied from a high-voltage battery 22 to the electric motor 2b. Alternatively, a more distributed system may be used, in which a separate electronic controller, with which the transmission controller is communicatively connected, may be used for control of the power source 2b.

Clearly, the illustrated two-gear transmission is purely one example of many possible and alternative layouts, and the method and system of the disclosure is applicable to many other types of transmissions, such as for example three-gear up to but not limited to nine-gear transmissions, or even for example up to 25-gear transmissions, and the transmission may for example be a conventional and hybrid Dual Clutch Transmissions (DCT and DCTH) or Automated Manual Transmissions (AMT).

The transmission may also be implemented in many different types of drive trains, such as conventional combustion power drive trains having a combustion engine 2a as primary power source as schematically illustrated in FIG. 2B, or hybrid power trains as schematically illustrated in FIG. 2C having both a combustion engine 2a and an electrical motor 2b as power sources for vehicle propulsion. In such case, a friction clutch 5 may be provided for enabling selective pure electric drive mode.

To conclude, the method for determining the drag torque coefficient of a transmission is not limited to a vehicle transmission any may advantageously or alternatively be implemented or used in other types of transmissions.

The high-level gear shifting process of a multi-step transmission can for example be divided into following phases:
1. Torque ramp down
2. Sleeve to Neutral
3. Speed Synchronization
4. Sleeve to Gear Engagement
5. Torque Ramp up.

Figure 3A:
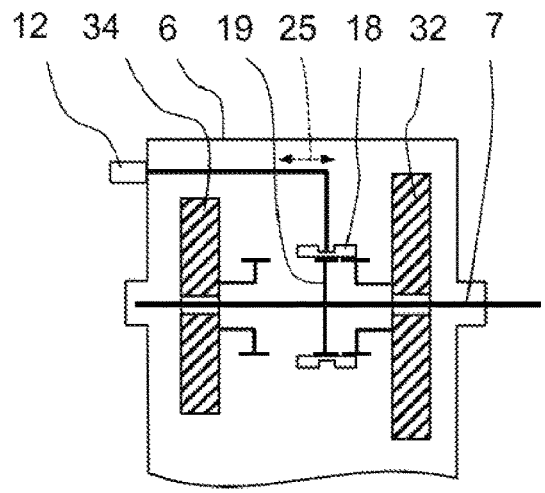
FIG. 3A-3C show schematically a sequence of disengagement, neutral and engagement of a gears in a transmission.
Figure 3B:
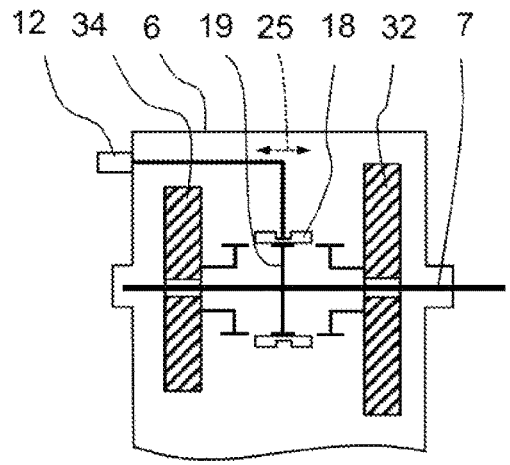
Figure 3C:
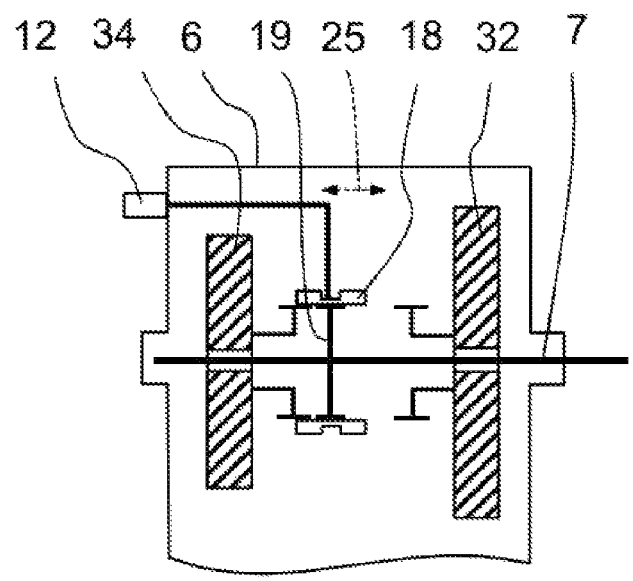

FIGS. 3A-3C illustrate a gear upshift of the schematic example transmission of FIGS. 2A-2C. For simplicity, FIGS. 3A-3C illustrate only part of the transmission of FIGS. 2A-2C, wherein FIG. 3A shows the transmission with the first gear 9 engaged, i.e. with the shift sleeve 18 in torque transfer connection with freewheeling second gear wheel 32 and the main shaft 7.

FIG. 3B shows the transmission in a state when the shift sleeve 18 has moved axially to a neutral state, i.e. a state in which the shift sleeve 18 is disconnected from both the freewheeling second and fourth gears 32, 34. Since both freewheeling second and fourth gears 32, 34 are mutually rotationally via first and third gear wheels 31, 33 and the input shaft 8, as shown in FIGS. 2A-2C, the freewheeling fourth gear wheel 34 of the second gear 10 has a higher rotational speed than the freewheeling second gear wheel 34 of the second gear 9, due to the different gear ratio of the first and second gears 9, 10. Consequently, the rotational speed of the freewheeling fourth gear wheel 34 must be decreased before the shift sleeve 18 can engage with the fourth gear wheel 34. This process, in which the rotational speed of the fourth gear wheel 34 becomes synchronised, i.e. the rotational speed is adjusted to be the same as the rotational speed of the shift sleeve, is referred to as the rotational speed synchronisation, or simply synchronisation.

The synchronisation may be performed by in many different ways. For example, a synchronisation torque may be applied directly to the fourth gear wheel 34, or indirectly via any transmission component that is rotationally connected to the fourth gear wheel 34. In the example transmission of FIG. 2A, the synchronisation torque may thus be applied to any of the gear wheels 31-34, the input shaft 8, and the rotor of the electric motor 2b.

For example, the synchronisation torque may be provided by a sliding surface of the shift sleeve 18 being pressed axially against a corresponding sliding surface of the gear wheel 34, wherein the value of the resulting synchronisation torque depends on parameters such as axial contact pressure, friction surface size, friction surface material of the shift sleeve 18, etc. This approach involves synchronisation torque being applied directly to the fourth gear wheel 34.

Alternatively, or in combination, the electrical motor of FIG. 2A may be controlled to generate a synchronisation torque to the input shaft 8, wherein the current and/or voltage levels supplied to the electric motor 2b may be used for calculating a resulting synchronisation torque provided by the electric motor. This approach involves synchronisation torque being applied indirectly.

Still more alternatively, the clutch 5 of FIG. 2C may be controlled to close to a certain degree for generating a synchronisation torque to the fourth gear wheel 34 via the input shaft 8. In such case, the value of the resulting synchronisation torque depends on parameters such as axial contact pressure of the clutch 5.

Irrespective of the method for generating the synchronisation torque, the level of applied synchronisation to the fourth gear wheel 34 may be deemed known and readily available for use in the method and system for identification of the drag torque coefficient.

When the rotational synchronisation speed has been reached, i.e. when the shift sleeve 18 and the fourth gear wheel 34 rotates with the same speed, the shift sleeve 18 is displaced axially, such that dog clutch teeth of the shift sleeve 18 may enter in the recesses located between neighbouring dog teeth of the fourth gear wheel 34, thereby providing a torque transfer connection between the fourth gear wheel 34 and the main shaft 7.

Figure 4:
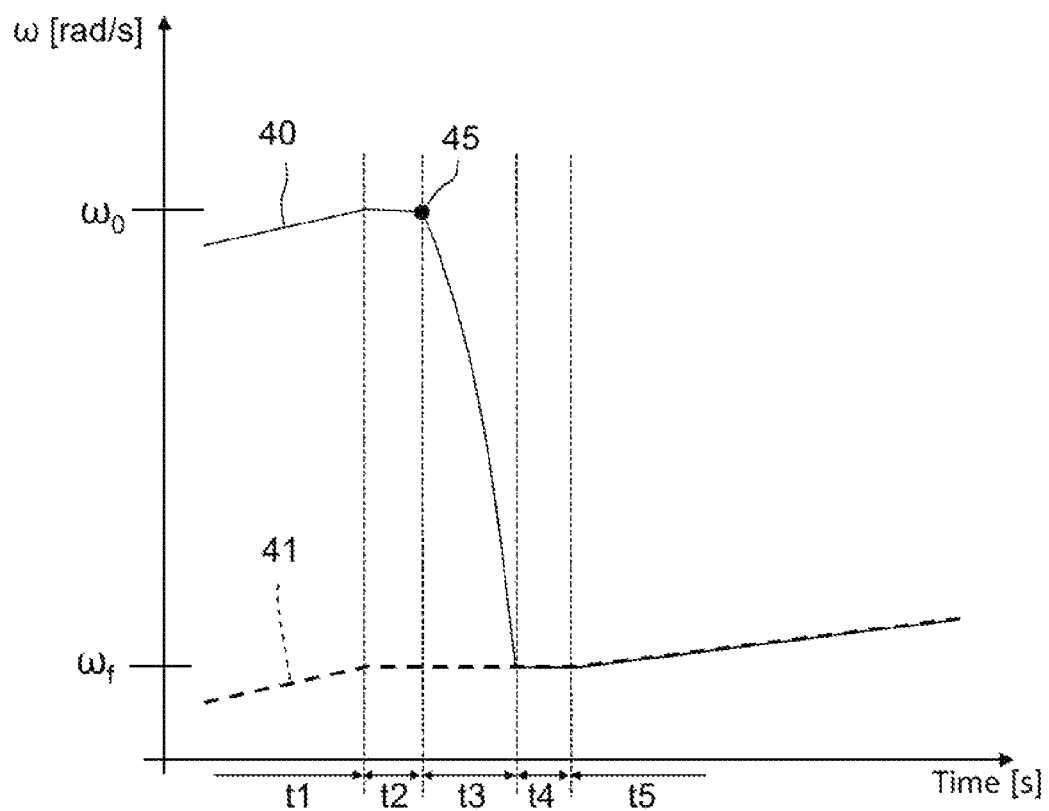
FIG. 4 shows schematically the rotational speed profile of a gear during a synchronisation process for an upshift.
Figure 6:
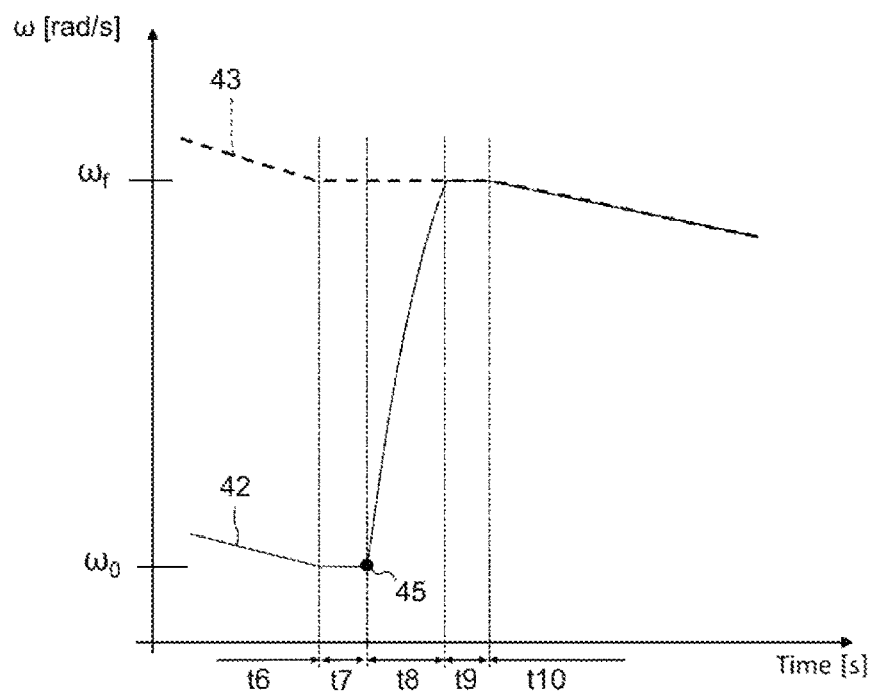
FIG. 6 shows schematically the rotational speed profile of a gear during a synchronisation process for a downshift.

Data for calculation of the drag torque coefficient is calculated based on data obtained from at least one real gear shifting process of the transmission, such as a transmission upshift, i.e. gearshift from the first gear 9 to the second gear 10, as schematically illustrated in FIG. 4, or a transmission downshift i.e. gearshift from the second gear 10 to the first gear 9, as schematically illustrated in FIG. 6.

In fact, due to the low data processing power required to merely first register relevant parameter values during the actual gear shifting process, and the subsequent offline (non-real-time) identification of the drag torque coefficient based on the registered parameter values, data collection during gear shifts may be performed relatively frequently for providing reliable estimates of the drag torque coefficient for various transmission operating conditions, such as various transmission oil temperatures.

FIG. 4 shows a graph having time (seconds) on the X-axis and rotational speed (radians/seconds) on the Y-axis, a first plotted line 40 illustrating a schematic example of a rotational speed of the oncoming fourth gear wheel 32 to be synchronised during the upshift, and a second plotted line 41 illustrating rotational speed of the shift sleeve 18 during said upshift.

In particular, during time period t1, the first gear 9 is still engaged, the power source provides propulsion torque and the rotational speed of both the shift sleeve 18 and second gear wheel 32 increases, thereby resulting in vehicle acceleration.

At the end of time period t1, the transmission controller initiates a gearshift to the second gear 10. Therefore, during the following second time period t2, the propulsion torque is first cancelled and the first gear 9 is subsequently disengaged by moving the shift sleeve 18 axially away from the second gear wheel 32, so that the dog teeth 26 of the shift sleeve and dog teeth 27 of the second gear wheel 32 disengage.

At this time point, the rotational speed 41 of the shift sleeve 18 is still the same as the rotational speed of the second gear wheel 32, and the rotational speed 40 of the oncoming fourth gear wheel 34 is higher, as shown in FIG. 4.

However, during the following third time period t3, also referred to as the synchronisation period, a synchronisation torque is applied to the fourth gear wheel 34, such that the rotational speed 40 of the oncoming fourth gear wheel 34 rapidly decreases. The synchronisation torque, which is constant during the third time period t3, may for example be applied via the friction surface of the shift sleeve 18 that is axially pressed against the fourth gear wheel 34 by means of the shift actuator 12.

At end of the third time period t3, the rotational speed 40 of the fourth gear wheel 34 has reached the rotational speed 41 of the shift sleeve 18. The transmission controller 20 may preferably be arranged to control the synchronisation process during the first time period t3, including the starting point of the third time period t3, such that the relative rotational position of the shift sleeve 18 and fourth gear wheel 34 at the end of the third time period t3 enable immediate axial shift motion of the shift sleeve 18 into engaged state without interference between dog teeth of the shift sleeve 18 and corresponding dog teeth of the fourth gear wheel 34.

Interference between dog teeth 26 of the shift sleeve 18 and corresponding dog teeth 27 of the second or fourth gear wheels 32, 34 means that there is mutual contact between said teeth 26, 27 before the shift sleeve 18 has reached complete engaged state, as illustrated by the shift sleeve 18* in dotted line in FIG. 2D.

In other words, the transmission controller 20 may be arranged to apply a control strategy that involves calculation of a suitable starting point of the synchronisation period t3, that results in a matching angular position of the teeth of the shift sleeve 18 and corresponding recess between neighbouring teeth of the fourth gear wheel 34 at the time point when the rotation speed 40 of the fourth gear wheel 34 reaches the rotational speed 41 of the shift sleeve 18, such that immediate gear engagement between the shift sleeve 18 and fourth gear wheel 34 may be performed without undesirable mutual teeth interference, because thereby the gear engagement may be performed faster, smoother and more silent.

Especially, but not only, when the control strategy involves axial displacement of the shift sleeve 18 into torque engagement with the fourth gear wheel 34 directly upon reaching synchronised rotational speed, accurate knowledge of the drag torque coefficient is advantageous because it enables more accurate estimation of a resulting angular acceleration $\alpha_g$ of the fourth gear wheel 34 when applying a certain synchronisation torque T.

Figure 5:
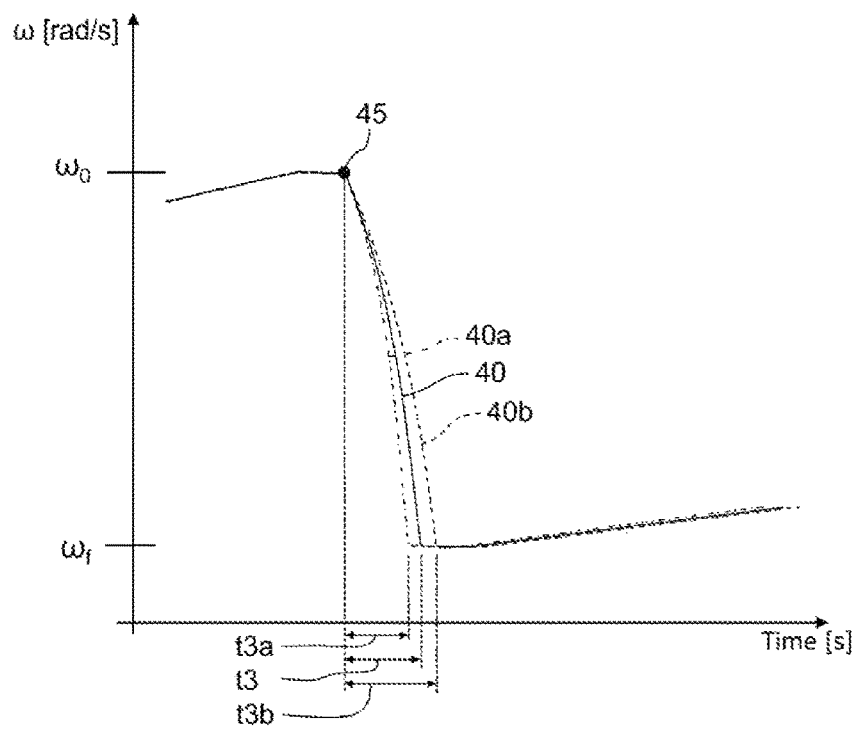
FIG. 5 shows schematically the influence of drag torque coefficient on the time period for performing the synchronisation process.

For example, the influence of a the drag torque coefficient on the synchronisation time period "$t_f$" is schematically illustrated in FIG. 5, wherein a solid line 40 corresponds to a rotational speed plot of the fourth gear wheel 34 over time during the synchronisation process of the upshift of FIG. 4, based on a first value of the drag torque coefficient, thereby providing a first synchronisation time period t3.

FIG. 5 also includes a dash-dotted line 40a corresponding to a rotational speed plot of the fourth gear wheel 34 over time during the synchronisation process of the upshift of FIG. 4, based on a second value of the drag torque coefficient that is higher than the first value, thereby providing a second synchronisation time period t3a that is shorter than the first synchronisation time period t3.

Finally, FIG. 5 also includes a dotted line 40b corresponding to a rotational speed plot of the fourth gear wheel 34 over time during the synchronisation process of the upshift of FIG. 4, based on a third value of the drag torque coefficient that is lower than the first value, thereby providing a third synchronisation time period t3b that is longer than the first synchronisation time period t3.

All plots of FIG. 5 are made assuming a constant and identical synchronisation torque.

It is thus clear that the drag torque coefficient is a relevant parameter for obtaining a fast, smooth and silent gear change of the transmission. For example, the drag torque coefficient is a relevant parameter for calculating a suitable starting point 45 for applying the synchronisation torque, which starting point 45 is selected to generate a matching relative rotational position of the dog teeth of the shift sleeve 18 and the recesses between neighbouring dog teeth of the fourth gear wheel 34, such that the subsequent gear teeth engagement may be performed without undesirable mutual interference.

Without knowledge of the drag torque coefficient, a constant drag torque TD may be used in a model based control strategy, but this will not provide the same accuracy as when using a rotational speed dependent drag torque, thus potentially resulting in less fast, less smooth and less silent gearshifts.

As described above, the synchronisation torque T is applied during the third time period t3, t8 in the examples of FIGS. 4 and 5, and having a length corresponding the length of the third time period t3, t8, which corresponds to the synchronisation time period $t_f$.

The drag torque for a certain gear wheel may be calculated by $$T_d = b \times \omega$$

where b=drag torque coefficient, i.e. a constant friction coefficient, and ω=rotational speed of the gear wheel.

The resulting angular acceleration $\alpha_g$ of a freewheeling gear wheel is calculated by for upshifts by $$\alpha_g = (-T_{synch}(b \times \omega)) \div J$$

for upshifts, and $$\alpha_g = (T_{synch} - (b \times \omega)) \div J$$

for downshifts, where J is the total inertia associated with the gear wheel, $T_{synch}$ is the synchronisation torque, which is also referred to as "T" herein, and $T_d$ is the drag torque.

The transmission drag torque, which may be referred to an internal rotational resistance in the transmission, is for example caused be friction losses in bearings, churning, windage caused by oil in the transmission, gear meshing, etc.

For determining J, which is the total inertia associated with the gear wheel, all rotating components of the transmission that are rotationally connected to the gear wheel must be taken into account. Specifically, the rotational inertia of each individual rotatable part that is rotatably connected to the gear wheel, as well as the gear ratio n between the gear wheel and each individual rotatable part, must be taken into account when determining the total rotational inertia associated with the gear wheel.

Consequently, calculation of J depends on whether the synchronization is done with the shift sleeve 18 or with electric motor, because of the difference in rotational inertia of the rotor of the electric motor and the shift sleeve 18.

As an example, in the example transmission of any of FIGS. 2A-2C, the total moment of inertia associated with the fourth gear wheel 34 corresponds to a combined moment of inertia of all transmission components that are rotationally connected to the fourth gear wheel 34, i.e. according to FIGS. 2A-2C: the first, second and third gear wheels 31-33, the input shaft 8 and all rotating parts of the power source(s) 2a, 2b that are rotationally connected to the input shaft 8, because all these parts are permanently rotationally connected.

With reference again to FIG. 4, during the fourth time period t4, the shift sleeve is moved axially to become rotationally connected and engaged with the fourth gear wheel 34, and the propulsion torque may be ramped up, such that the vehicle may continue the acceleration during the subsequent fifth time period t5.

Moreover, FIG. 6 shows a corresponding graph including a plotted first line 42 illustrating a schematic example of a rotational speed of the oncoming second gear wheel 32 to be synchronised during an downshift, and a second plotted line 43 illustrating rotational speed of the shift sleeve 18 during said downshift.

In particular, during the first time period t6, the second gear 10 is still engaged, no propulsion torque is provided and the rotational speed of both the shift sleeve 18 and fourth gear wheel 34 decreases, thereby resulting in vehicle deceleration.

At the end of the first time period t6, the transmission controller 20 initiates a gear downshift to the first gear 9. Therefore, during the following second time period t7, the second gear 10 is disengaged by moving the shift sleeve axially, so that the dog teeth of the shift sleeve 18 and fourth gear wheel 34 disengage.

At this time point, the rotational speed 43 of the shift sleeve 18 is still the same as the rotational speed of rotational speed of fourth gear wheel 34, and the rotational speed 42 of the oncoming second gear wheel 32 is lower, as shown in FIG. 6.

However, during the following third time period t8, a synchronisation torque is applied to the second gear wheel 32, such that the rotational speed of the oncoming second gear wheel 32 rapidly increases. The synchronisation torque, which is constant during the third time period t8, may for example be applied via the electric motor 2b shown in FIGS. 2A and 2C.

At end of the third time period t8, the rotational speed 42 of the second gear wheel 32 has reached the rotational speed 43 of the shift sleeve 18. The transmission controller 20 may preferably be arranged to control the synchronisation process during the third time period t8, including the starting point of the third time period t8, such that the relative rotational position of the shift sleeve 18 and second gear wheel 32 at the end of the third time period t8 enables immediate axial shift motion of the shift sleeve 18 without interference between dog teeth 26 of the shift sleeve 18 and corresponding dog teeth 27 of the second gear wheel 32.

During the fourth time period t9, the shift sleeve 18 is moved axially to become rotationally connected and engaged with the second gear wheel 32, and the vehicle may continue the decelerating during the subsequent fifth time period t10.

A detailed description of an example method for identification of the drag torque coefficient "b" is provided below.

Assume that a body with inertia "J" is rotating with a rotational speed "ω". When a rotational torque "T" is applied to the body, a differential equation describing the body can be written as:

$$T = J\dot{\omega} + b\omega \quad (1)$$

where "b" is the drag torque coefficient and the term "bω" is the drag torque Td.

If there is no drag torque, equation (1) can be written as:

$$T = J\dot{\omega} \quad (2)$$

The solution of equation (1) can be written as:

$$\omega(t) = \frac{T}{b} + \left[\omega_0 - \frac{T}{b}\right] e^{\left(\frac{-bt}{J}\right)} \quad (3)$$

Equation (3) shows that the evolution of rotational speed "ω" of the body with respect to time when applying a constant rotational torque "T" to body having an initial rotational speed "$\omega_0$".

If a constant rotational torque "T" is applied to a body having initial rotational speed $\omega_0$, the body reaches a certain rotational speed "$\omega_{final}$" ((also denoted "$\omega_f$") after synchronisation time period "$t_f$", which can be calculated from equation (3) as:

$$t_f = \ln\left[\frac{\omega_f - \left(\frac{T}{b}\right)}{\omega_0 - \left(\frac{T}{b}\right)}\right] \cdot \left(\frac{-J}{b}\right) \quad (4)$$

The drag torque coefficient "b" in equation (3) is unknown, but equation (3) cannot be solved to a form as:

$$b = \text{function of } (T, J, t, \omega(t), \omega_0) \quad (5)$$

The present disclosure therefore provides an alternative approach for identification of "b". Assume a gear shift process in a multi gear transmission, such as during normal driving or during an End-of-Line test and calibration, wherein during the synchronisation process a body having inertia "J" is caused to change rotational speed from $\omega_0$ to $\omega_f$ in a synchronisation time period "$t_f$" under the influence of applied constant rotational torque "T". Equation (3) may then be written as:

$$\omega_f = \frac{T}{b} + \left[\omega_0 - \frac{T}{b}\right]e^{\left(\frac{-bt_f}{J}\right)} \tag{6}$$

If values of initial rotational speed "$\omega_0$", final rotational speed "$\omega_f$" and the synchronisation time period "$t_f$" are obtained during said synchronisation process, for example by means of rotational speed sensor and a control unit associated with the transmission, and if rotational inertia of the body is known and the applied rotational torque is known or can be obtained, only the drag torque coefficient "b" is unknown.

When analysing the limit values of "b", i.e.:

$$b \in [b_{min}, b_{max}] \tag{7}$$

It is clear that the lower limit $b_{min}$ will be zero, which corresponds to a complete lack of drag torque in the transmission:

$$b_{min}=0 \tag{8}$$

If $b=b_{min}=0$, equation (1) changes to equation (2), i.e. $T=J\omega_0$

A solution of equation (2) is:

$$\omega(t) = \omega_0 + \frac{T}{J} \cdot t \tag{9}$$

So that when $b=b_{min}$, equation (9) gives that:

$$\omega_{f\_max} = \omega_0 + \frac{T}{J} \cdot t_f \tag{10}$$

On the other hand, maximum value of "b" will correspond to a friction so high that it takes an infinite amount of time for inertia J to reach $\omega f$.

Consequently, if $t_f=\infty$ in equation (4) then $$\omega_f - \frac{T}{b} = 0,$$

because ln(0) is undefined, thus resulting in:

$$b_{max} = \frac{T}{\omega_f}.$$

Consequently, equation (7) can be written as:

$$b \in \left[0, \frac{T}{\omega_f}\right] \tag{11}$$

Moreover, if $b=b_{max}$, then after a time a finite $t_f$ obtained during the synchronisation process, the rotational speed $\omega_{f\_min}$ can be calculated by equation (6) as:

$$\omega_{f\_min} = \frac{T}{b_{max}} + \left[\omega_0 - \frac{T}{b_{max}}\right]e^{\left(\frac{-b_{max}t_f}{J}\right)} = \omega_f + [\omega_0 - \omega_f]e^{\left(\frac{-Tt_f}{J\omega_f}\right)} \tag{12}$$

Figure 7:
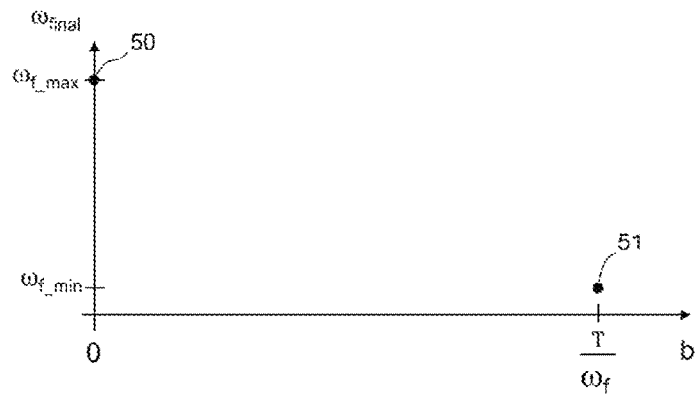
FIG. 7 shows schematically the end values of the drag torque coefficient.

Consequently, equations (11), (12) and (10) gives that "b" moves from 0 to $$\frac{T}{\omega_f},$$

and $\omega_f$ moves from $\omega_{f\_max}$ to $\omega_{f\_min}$, as depicted by endpoints 50, 51 in FIG. 7.

It can be derived from FIG. 7 and equation (6) that "b" and $\omega f$ form a sorted array, meaning that when "b" increases $\omega_f$ decreases.

Consequently, a search algorithm may advantageously be used for identifying the value of "b" that corresponds to the measured value of $\omega_f$ as obtained during the synchronisation process of an actual gearshift during driving of the vehicle, as described above.

For example, a so-called Binary Search Algorithm may be used for identifying "b". Binary search algorithm is also known as half-interval search algorithm, and is a search algorithm that finds the position of a target value within a sorted array.

Figure 8:
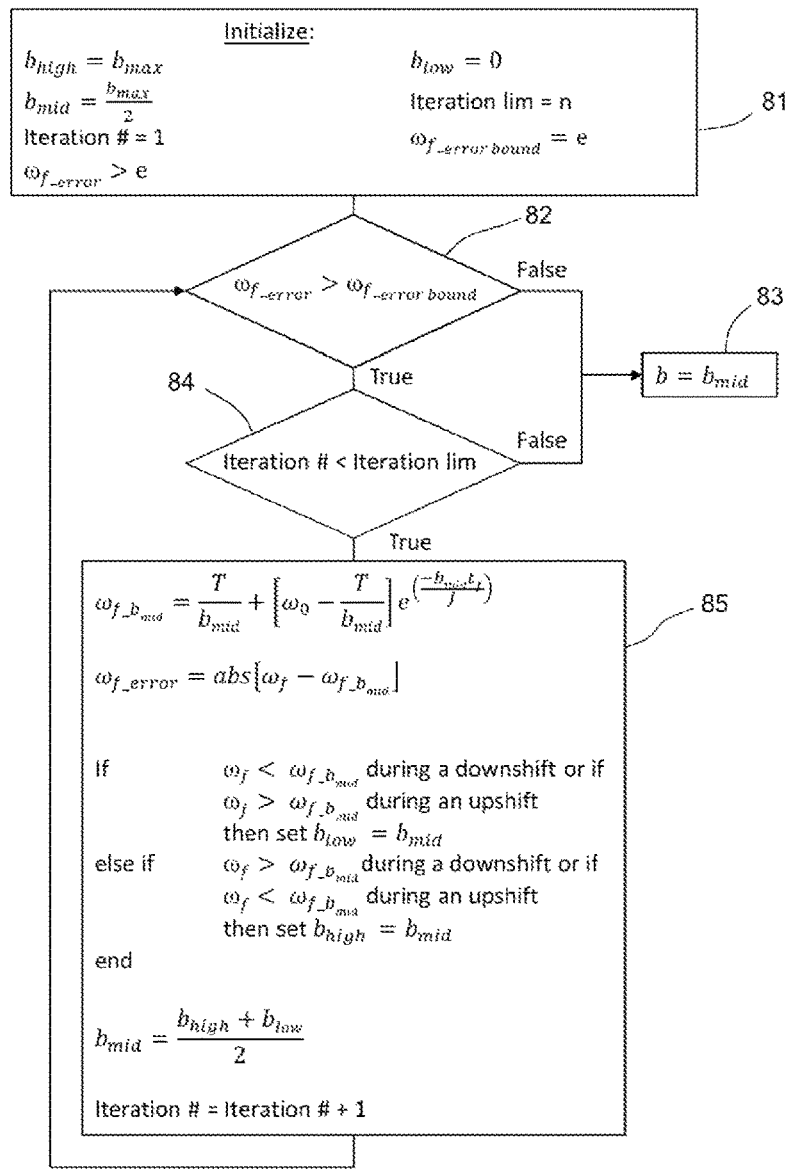
FIG. 8 shows an example embodiment of a search algorithm for identifying the drag torque coefficient.

A flow chart describing an example of a Binary Search Algorithm suitable for identifying the drag torque coefficient "b" is illustrated in FIG. 8.

In the initialization phase 81 of the algorithm, various parameters are defined and set. For example $b_{high}$ and $bl_{ow}$ defining the increasingly narrowed boundaries of "b" and being initialised with $b_{max}$ and 0, in accordance with equation (11).

The parameter $b_{mid}$ defines a centre point in the range defined by the end values $b_{high}$ and $b_{low}$.

A maximal number of iterations may be set by setting a variable referred to as "Iteration lim" equal to a value n. When setting n=50 the algorithm will certainly not perform more than 50 iterations, and a variable "Iteration #" may be set to "1" for keeping track of the number of iterations.

The algorithm will continue iterating until a calculated value of the final rotational speed $\omega f$ is sufficiently close to the measured value of $\omega f$. This is controlled by setting a variable "$\omega_{f\_error\ bound}$", which defines an acceptable deviation between the calculated value of $\omega f$ and measured value of $\omega_f$ equal to a certain value "e".

An operating variable designating a current error value and referred to as "$\omega_{f\_error}$" is initially set larger than "e" for ensuring that the error initially is larger than acceptable.

After initialisation, a first error evaluation 82 is performed, which involves comparing the current error value "$\omega_{f\_error}$" with the "$\omega_{f\_error\ bound}$". If the current error value "$\omega_{f\_error}$" is smaller than the acceptable, as defined by "$\omega_{f\_error\ bound}$", a sufficiently accurate value of "b" is deemed to be found and the algorithm in step 83 presents the result "b"="$b_{mid}$" and terminates the algorithm.

Otherwise, a second evaluation 84 is performed, which involves comparing the current value of the variable "Iteration #" with the variable "Iteration lim". If the current iteration number "Iteration #" is larger than the maximal number of iterations "Iteration lim", a sufficiently accurate value of "b" is deemed to be found and the algorithm in step 83 presents the result "b"="$b_{mid}$" and terminates the algorithm.

The second evaluation step 84 may be omitted from the algorithm may then it may under certain circumstance be a risk for an infinite loop. Moreover, the order of the first and second evaluation steps 82, 84 may be altered.

If the current error value "$\omega_{f\_error}$" is larger than acceptable, as defined by "$\omega_{f\_error\_bound}$", and if the current iteration number "Iteration #" is smaller than the maximal number of iterations "Iteration lim", the algorithm proceeds to calculation step 85, which includes first calculation of a final rotational speed "($107_{f\_bmid}$" of the gear wheel based on "$b_{mid}$" as drag torque coefficient, an obtained constant synchronisation torque "T" applied during an obtained synchronisation time period "$t_f$", a constant total rotational inertia "J" associated with the gear wheel, and an obtained starting rotational speed "$\omega_0$".

The obtained value of the constant synchronisation torque "T" may for example obtained by detecting axial actuator force of a shift sleeve actuator, or by detecting current and/or voltage levels of an electric motor used for applying the synchronisation torque.

The obtained synchronisation time period "$t_f$" may for example be obtained by reading the time point at start of the synchronisation period and at the end of the synchronisation period, and calculating the difference.

The obtained constant total rotational inertia "J" associated with the gear wheel may for example be calculated beforehand based on the specific design the transmission and the specific transmission mode.

The obtained values of the starting rotational speed "$\omega_0$" and the obtained value of the final rotational speed "$\omega_f$" is for example registered and obtained by reading an output of a rotational speed sensor arranged for detecting the rotational speed of the gear wheel at said specific time points, i.e. at start and end of the synchronisation period.

Thereafter, a new error value "$\omega_{f\_error}$" is calculated based on the difference between the calculated value of the of a final rotational speed "$\omega_{f\_bmid}$" with an obtained value of the final rotational speed "$\omega_f$". For example, the new error value "$\omega_{f\_error}$" may be equal to an absolute value of the obtained value of the final rotational speed "$\omega f$" minus the calculated value of the final rotational speed "$\omega_{f\_bmid}$".

Thereafter, one of the end values $b_{high}$, blow of the range of the value "b" is adjusted for narrowing down the range of "b" by half of the previous range of "b". Specifically, if the calculated value of the final rotational speed "$\omega_{f\_bmid}$" is larger than the obtained value of the final rotational speed "$\omega_f$" during a downshift, or if the calculated value of the final rotational speed "$\omega_{f\_bmid}$" is smaller than the obtained value of the final rotational speed "$\omega_f$" during an upshift, then the lower end value blow may be set to braid.

Moreover, if the calculated value of the final rotational speed "$\omega_{f\_bmid}$" is larger than the obtained value of the final rotational speed "$\omega_f$" during an upshift, or if the calculated value of the final rotational speed "$\omega_{f\_bmid}$" is smaller than the obtained value of the final rotational speed "$\omega_f$" during a downshift, then the higher end value $b_{high}$ may be set to $b_{mid}$.

Thereafter, a new value of $b_{mid}$ is calculated as the centre of range defined by updated values of end values $b_{high}$ and $b_{low}$ of the range of "b", and the variable "Iteration #" is increased with one.

After this, the algorithm goes back to the first evaluation step 82, thereby forming an iterating algorithm involving steps 82, 84 and 85 described above, until the calculated error value "$\omega_{f\_error}$" is smaller than maximal allowed error "$\omega_{f\_error\_bound}$", at which stage the algorithm in step 83 presents the result "b"="$b_{mid}$" and terminates the algorithm, as described above.

Figure 9:
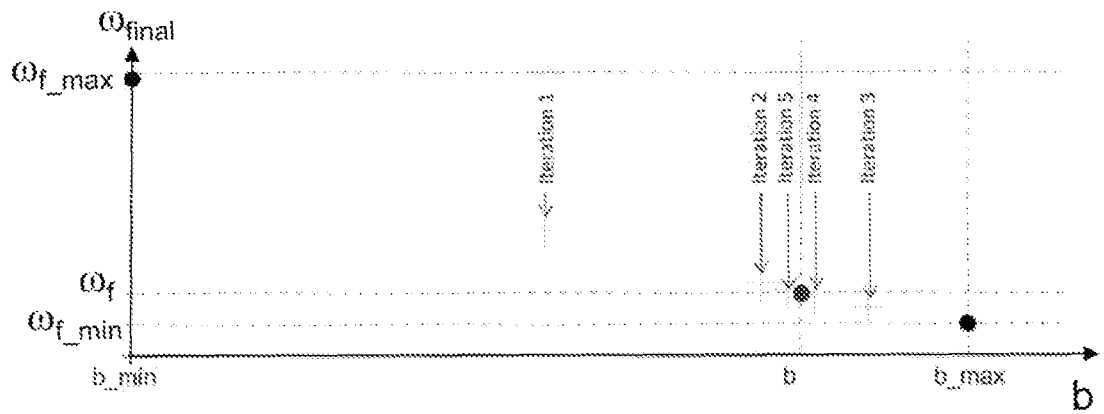
FIG. 9 shows schematically an example of the execution of the search algorithm of FIG. 8.

FIG. 9 schematically illustrates the operating behaviour of the search algorithm, wherein the initial end values b_min, b_max are illustrated, as well as corresponding maximal and minimal values of rotational speed "$\omega_{f\_max}$" and "$\omega_{f\_min}$". FIG. 9 also shows the obtained value of the final rotational speed "$\omega_f$", as well as the value of drag torque coefficient "b" that corresponds to said final rotational speed "$\omega_f$".

In iteration 1, the value $b_{mid}$ is set in the centre of b_min and b_low. Thereafter, calculation of the final rotational speed "($\omega_{f\_bmid}$" of the gear wheel based on "$b_{mid}$" gives that "$\omega_f$"<"$\omega_{f\_bmid}$". Consequently, b_low is set to $b_{mid}$, thereby halving the range of "b". The algorithm then iterates and the result is shown in FIG. 9, where one can see how the algorithm gradually narrows down the range of a "b" until the error value "$\omega_{f\_error}$" is smaller than maximal allowed error "$\omega_{f\_error\_bound}$", at which stage the algorithm presents the result "b"="$b_{mid}$" and terminates the algorithm.

Figures 10, 11, 12:
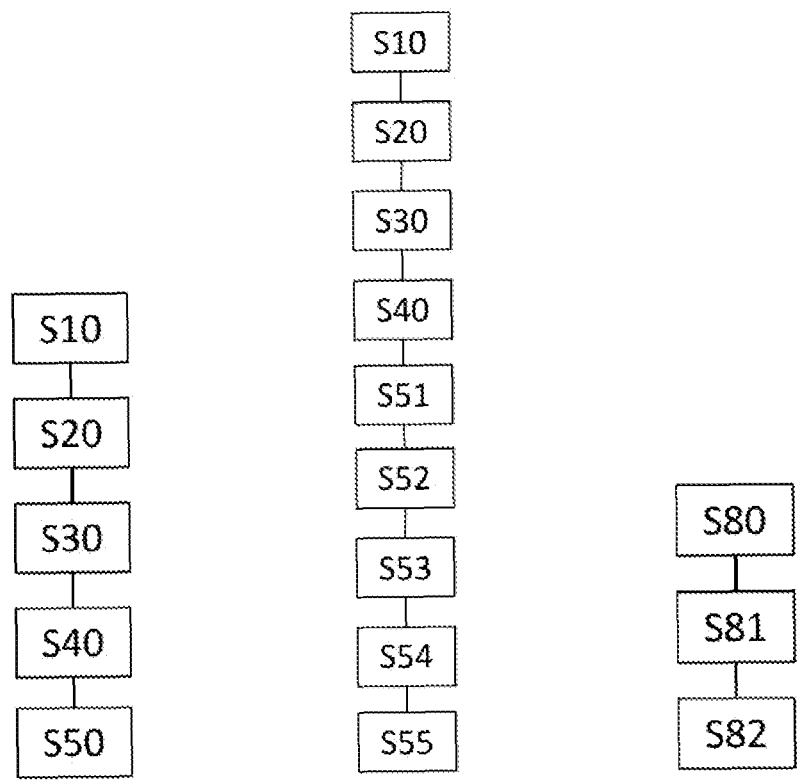
FIG. 10 shows an example embodiment of the basic steps of a method for identification of the drag torque coefficient.
FIG. 11 shows a further example embodiment of the steps of a method for identification of the drag torque coefficient.
FIG. 12 shows an example embodiment for controlling a rotational speed synchronisation of a transmission.

The present disclosure thus provides a method for determining a drag torque coefficient of a transmission. With reference to FIG. 10, the method according to one example embodiment comprises a first step S10 of performing a rotational speed synchronisation involving application of synchronisation torque "T" to a first transmission component 32, 34. In the example transmission of FIG. 2A, the first transmission component would correspond to the second or fourth gear wheel 32, 34.

The method further includes a second step S20 of obtaining an initial rotational speed ω0 of the first transmission component before the rotational speed synchronisation, and a final rotational speed $\omega_f$ of the first transmission component after the rotational speed synchronisation, and time period "$t_f$" for performing the rotational speed synchronisation.

The method further includes a third step S30 of obtaining information relating to a level of the synchronisation torque applied to the first transmission component during the rotational speed synchronisation, and a fourth step S40 of obtaining information relating to a total moment of inertia associated with the first transmission component.

Finally, the method includes a fifth step S50 of determining the drag torque coefficient based on the obtained initial rotational speed, the obtained final rotational speed, the obtained time period, the level of the applied synchronisation torque and the total moment of inertia associated with the first transmission component.

Clearly, various modifications may be made of the method steps S10-S50 described above. For example, each of the third and the fourth steps S30, S40 may be performed either before or after the step of registering the speed change profile of the first transmission component 32, 34 during the synchronisation period.

More in detail, the fifth step of determining the drag torque coefficient based on the obtained initial rotational speed, the obtained final rotational speed, the obtained time period, the level of the applied synchronisation torque and the total moment of inertia associated with the first transmission component, may be performed after the gear shift process including the rotational speed synchronisation has been finalized. In other words, the first and second steps S10, S20 of the method may be performed in real-time, i.e. during the actual gearshift, but the fifth step S50 may be permed offline, i.e. after completed gearshift. In fact, the fifth step S50 may even be performed by a CPU different from the transmission controller 20, or by the transmission controller 20 during times of low gear shift activity.

Furthermore, in some example embodiments, the fifth step S50 of determining the drag torque coefficient involves using an equation having as terms the drag torque coefficient b, the initial rotational speed $\omega 0$ of the first transmission component 32, 34 before the rotational speed synchronisation, the final rotational speed $\omega_f$ of the first transmission component 32, 34 after the rotational speed synchronisation, the time period $t_f$ for performing the rotational speed synchronisation, the level of applied synchronisation torque T and total moment of inertia J associated with the first transmission component 32, 34.

Furthermore, in some example embodiments, the fifth step S50 of determining the drag torque coefficient involves applying a Search Algorithm, in particular a Binary Search Algorithm, for identifying the drag torque coefficient. However, other search algorithms may alternatively be used, such as for example "peak search algorithm", "linear search algorithm", "jump search algorithm", or the like.

With reference to FIG. 11, when the fifth step S50 includes applying the Binary Search Algorithm for determining the drag torque coefficient, the fifth step comprises a first sub step S51 of setting a value of the drag torque coefficient $b_{mid}$ equal to an initial drag torque coefficient value.

The fifth step further comprises a second sub step S52 of calculating a value of one of terms:
initial rotational speed of the first transmission component,
final rotational speed of the first transmission component,
time period for performing the rotational speed synchronisation,
level of synchronisation torque, and
total moment of inertia associated with the first transmission component,
based on an equation having as terms the drag torque coefficient, initial rotational speed of the first transmission component, final rotational speed of the first transmission component, time period for performing the rotational speed synchronisation, the obtained level of synchronisation torque and the obtained level of moment of inertia.

The fifth step further comprises a third sub step S53 of calculating an error value equal to a difference between the obtained value of said term and the calculated value of said term, and a fourth sub step S54 of comparing the error value with an error margin and terminating the Binary Search Algorithm when the error value is smaller or equal to the error margin.

Finally, the fifth step further comprises a fifth step S55 of comparing the obtained value of said term with the calculated value of the said term, adjusting the value of the drag torque coefficient accordingly, and keep repeating the second to fifth steps of the Binary Search Algorithm.

In other words, the Binary Search Algorithm may in fact be applied based in any of the parameters the equation. For example, if total inertia or synchronisation torque is used for calculating a parameter based on a certain value of drag torque coefficient bmid, the resulting value of the total inertia or synchronisation torque would at least to begin with likely deviate from the obtained value of total inertia or synchronisation torque, thereby enabling proper narrowing down of the available drag torque coefficient range b_min, b_max.

Specifically, according to some example embodiments, the final rotational speed $\omega f$ the first transmission component 32, 34 may be used as variable for comparing calculated and obtained values, and for deducting how the available drag torque coefficient range b_min, b_max may be narrowed down based on the result. In such a scenario, the method comprises a first sub step S51 of setting the drag torque coefficient equal to an initial drag torque coefficient, and a second sub step S52 of calculating a final rotational speed of the first transmission component based on an equation having as terms also the drag torque coefficient, the obtained initial rotational speed of the first transmission component, the obtained time period for performing the rotational speed synchronisation, the obtained level of synchronisation torque and the obtained level of moment of inertia.

The method further comprises a third sub step S53 of calculating an error value equal to a difference between the obtained final rotational speed and the calculated final rotational speed, and a fourth sub step S54 of comparing the error value with an error margin and terminating the Binary Search Algorithm when the error value is smaller or equal to the error margin.

Finally, the method comprises a fifth sub step S55 of comparing the obtained final rotational speed with the calculated final rotational speed, adjusting the value of the drag torque coefficient accordingly, and keep repeating the second to fifth steps of the Binary Search Algorithm.

In some example embodiments of the method according to the disclosure, the first step S10 additionally includes setting an upper drag torque coefficient limit equal to an initial upper drag torque coefficient limit, setting a lower drag torque coefficient limit equal to an initial lower drag torque coefficient limit, and setting the initial drag torque coefficient within a range defined by the upper and lower drag torque coefficient limits, in particular at a centre of said range defined by the upper and lower drag torque coefficient limits. By appropriate selection of upper and lower drag torque coefficient limits, the likelihood that the search algorithm will converge to a value of the drag torque coefficient $b_{mid}$ that provides an error value within an error margin is increased, because the actual value of the drag torque coefficient $b_{mid}$ will then be provided within the initial range defined by the initial upper and lower drag torque coefficient limits.

Furthermore, the fifth sub step S55 of adjusting the value of the drag torque coefficient accordingly, involves comparing the obtained final rotational speed with the calculated final rotational speed, and when the obtained final rotational speed is smaller than the calculated final rotational speed during gear downshift, or when the obtained final rotational speed is larger than the calculated final rotational speed during gear upshift, the fifth sub step S55 involves setting the lower drag torque coefficient limit equal to the drag torque coefficient, and setting the drag torque coefficient equal to centre of range defined by the upper drag torque coefficient limit and the lower drag torque coefficient limit, and keep repeating the second to fifth steps of the Binary Search Algorithm.

However, when the obtained final rotational speed is larger than the calculated final rotational speed during gear downshift, or when the obtained final rotational speed is smaller than the calculated final rotational speed during gear upshift, the fifth sub step S55 involves setting the upper drag torque coefficient limit equal to the drag torque coefficient, and setting the drag torque coefficient equal to centre of range defined by the upper drag torque coefficient limit and the lower drag torque coefficient limit, and keep repeating the second to fifth steps of the Binary Search Algorithm.

As described above, depending on the selected parameter from the set of: initial rotational speed of the first transmission component, final rotational speed of the first transmission component, time period for performing the rotational speed synchronisation, level of synchronisation torque, and total moment of inertia associated with the first transmission component, a suitable equation may be used for calculating a value of the selected parameter that subsequently may be compared with an obtained value of said parameter, i.e. a value detected, measured or registered during the actual synchronisation period, or a value derived from the transmission design, such as rotational inertia.

When the final rotational speed $\omega_f$ is selected as parameter, the calculation of the final rotational speed in the second step of the Binary Search Algorithm may be performed using the equation:

$$\omega_{f\_b_{mid}} = \frac{T}{b_{mid}} + \left[\omega_0 - \frac{T}{b_{mid}}\right] \times e^{\frac{b_{mid} t_f}{J}},$$

wherein
$\omega_{f\_b_{mid}}$=calculated final rotational speed
$\omega_0$=initial rotational speed of the first transmission component
T=synchronisation torque
$b_{mid}$=drag torque coefficient
$t_f$=synchronisation time period
J=total moment of inertia associated with the first transmission component.

Similarly, when the time period "$t_f$" for performing the rotational synchronisation is selected as parameter, the fifth step S50 of applying the Binary Search Algorithm comprises a first sub step S51 of setting the drag torque coefficient equal to an initial drag torque coefficient, and a second sub step 52 of calculating a time period for performing the rotational speed synchronisation based on an equation having as terms also the drag torque coefficient, the obtained initial rotational speed of the first transmission component, the obtained final rotational speed of the first transmission component, the obtained level of synchronisation torque and the obtained level of moment of inertia.

The method then further comprises a third step S53 of calculating an error value equal to a difference between the obtained time period for performing the rotational speed synchronisation and the calculated time period for performing the rotational speed synchronisation, and a fourth step S54 of comparing the error value with an error margin and terminating the Binary Search Algorithm when the error value is smaller or equal to the error margin.

Finally, the method then comprises a fifth step S55 of comparing the obtained time period for performing the rotational speed synchronisation with the calculated time period for performing the rotational speed synchronisation, adjusting the value of the drag torque coefficient accordingly, and keep repeating the second to fifth steps of the Binary Search Algorithm.

In some example embodiments of the method according to the disclosure, the first step S10 additionally includes setting an upper drag torque coefficient limit equal to an initial upper drag torque coefficient limit, setting a lower drag torque coefficient limit equal to an initial lower drag torque coefficient limit, and setting the initial drag torque coefficient within a range defined by the upper and lower drag torque coefficient limits, in particular at a centre of said range defined by the upper and lower drag torque coefficient limits.

Furthermore, the fifth sub step S55 of adjusting the value of the drag torque coefficient accordingly, involves comparing the obtained time period for performing the rotational speed synchronisation with the calculated time period for performing the rotational speed synchronisation, and when the obtained time period for performing the rotational speed synchronisation is smaller than the calculated time period for performing the rotational speed synchronisation during gear downshift, or when the obtained time period for performing the rotational speed synchronisation is larger than the calculated time period for performing the rotational speed synchronisation during gear upshift, the fifth sub step S55 involves setting the lower drag torque coefficient limit equal to the drag torque coefficient, and setting the drag torque coefficient equal to centre of range defined by the upper drag torque coefficient limit and the lower drag torque coefficient limit, and keep repeating the second to fifth steps of the Binary Search Algorithm.

However, when the obtained time period for performing the rotational speed synchronisation is larger than the calculated time period for performing the rotational speed synchronisation during gear downshift, or when the obtained time period for performing the rotational speed synchronisation is smaller than the calculated time period for performing the rotational speed synchronisation during gear upshift, the fifth sub step S55 involves setting the upper drag torque coefficient limit equal to the drag torque coefficient, and setting the drag torque coefficient equal to centre of range defined by the upper drag torque coefficient limit and the lower drag torque coefficient limit, and keep repeating the second to fifth steps of the Binary Search Algorithm.

As described above, various parameters may be selected in combination with a suitable equation for calculating a value of the selected parameter that subsequently may be compared with an obtained value of said parameter, i.e. a value detected, measured or registered during the actual synchronisation period, or a value derived from the transmission design, such as rotational inertia.

When the time period "$t_f$" for rotational synchronisation is selected as parameter, the calculation of the time period in the second step of the Binary Search Algorithm may be performed using the equation:

$$t_{f\_b_{mid}} = \frac{-J}{b_{mid}} \times \ln\left[\frac{\omega_f - \frac{T}{b_{mid}}}{\omega_0 - \frac{T}{b_{mid}}}\right],$$

wherein
$t_{f\_b_{mid}}$=calculated time period for performing the synchronisation based on $b_{mid}$ as drag torque coefficient
$\omega_0$=initial rotational speed of the first transmission component
T=synchronisation torque
$b_{mid}$=drag torque coefficient
$\omega_f$=final rotational speed of the first transmission component
J=total moment of inertia associated with the first transmission component.

In addition, in accordance with equation (11) above, the method may comprise setting the initial upper drag torque coefficient limit equal to synchronisation torque divided by obtained final rotational speed, and setting the initial lower drag torque coefficient limit equal to nil. Thereby, the entire possible range of the drag torque coefficient is included in the search scope of the search algorithm.

With reference to FIG. 12, the disclosure also relates to a method for controlling the rotational speed synchronisation of a transmission, wherein the method comprises a first step S80 of determining a drag torque coefficient of the transmission during a first rotational speed synchronisation according to the method as defined above, a second step S81 of calibrating a transmission control software based on the determined drag torque coefficient, and a third step S82 of controlling a subsequent second rotational speed synchronisation of the transmission by means of the calibrated transmission control software.

This method describes the basic functionality and operation for taking advantage of the present method and system for identification of the drag torque coefficient, namely by first registering and obtaining relevant operating parameters for subsequent identification of the drag torque coefficient during a real gear shift manoeuvre, then identifying said drag torque coefficient and calibrating the transmission control software based on the determined drag torque coefficient.

Consequently, the method enables identification of the friction torque coefficient from data collected from gear shift in the past under certain conditions, and when the same gear shift is scheduled again under same conditions, the most accurate value of friction torque coefficient will be available to the transmission control unit 20, hence enabling a more accurate control that results in faster, smoother and more silent gear shifts.

Since each transmission has an individual and unique drag torque characteristic, calibration of each transmission while taking into account the unique drag torque coefficient is an important step for accomplishing fast, smooth and silent gear shifts.

The calibration step based on frequently updated data of the drag torque coefficient also enables the transmission controller to continuously adapt to degradation of transmission oil characteristic over time, as well as wear of transmission components, such as bearings, gears, and sealings, etc. Consequently, the monitoring of the drag torque coefficient may additionally be used for scheduling transmission service and/or repair events, depending on the current status and history of the monitored drag torque coefficient.

The disclosure also relates to an electronic control unit comprising a processor configured to perform the method described above. The electronic control unit may for example be the transmission controller 20.

The method according to the disclosure is typically implemented in form of a computer program comprising instructions which, when the program is executed by a computer, cause the computer to carry out the method described above. These instructions may for example be stored on a computer-readable storage medium, which may be read and subsequently executed by a computer, such that the computer may carry out the method as described above. Alternatively, according to another exemplary embodiment a cloud computing system can be configured to perform any of the method aspects presented herein. The cloud computing system may comprise distributed cloud computing resources that jointly perform the method aspects presented herein under control of one or more computer program products.

With reference to FIG. 2A, the present disclosure also relates to transmission system comprising an electronic control unit 20 and a transmission 6 including a first rotatable transmission component 32, 34, wherein the electronic control unit 20 is configured for, upon performing a rotational speed synchronisation involving application of synchronisation torque to the first transmission component 32, 34: obtaining an initial rotational speed ω0 of the first transmission component 32, 24 before the rotational speed synchronisation, and a final rotational speed ωf of the first transmission component 32, 34 after the rotational speed synchronisation, and time period t for performing the rotational speed synchronisation; obtaining information relating to a level of the synchronisation torque applied to the first transmission component 32, 34 during the rotational speed synchronisation; obtaining information relating to a total moment of inertia associated with the first transmission component 32, 34; and determining the drag torque coefficient based on the obtained initial rotational speed, the obtained final rotational speed, the obtained time period, the level of the applied synchronisation torque and the total moment of inertia associated with the first transmission component 32, 34.

As illustrated in for example FIG. 2A, the transmission 6 may be a stepped gear transmission including a plurality of driving gears 9, 10.

Moreover, as illustrated in for example FIGS. 2A and 2C, the disclosure also relates to drive train 4 for a hybrid electric or electric vehicle, wherein the drive train 4 comprises the transmission system described above, and an electric propulsion motor 2b drivingly connected with the transmission 6.

Moreover, with reference for FIG. 1, the disclosure also relates to a vehicle 1, such as a car, comprising the data processing control unit 20, or the transmission system or the drive train 4, as described above.

The present disclosure has been presented above with reference to specific embodiments. However, other embodiments than the above described are possible and within the scope of the disclosure. Different method steps than those described above, performing the method by hardware or software, may be provided within the scope of the disclosure.

The electronic control unit 20 includes one or more processors that may be or include any number of hardware components for conducting data or signal processing or for executing computer code stored in memory. The control unit 20 may have an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the

What is claimed is:

1. A method for determining a drag torque coefficient of a transmission, the method comprising:
   performing a rotational speed synchronisation involving application of a synchronisation torque to a first transmission component,
   obtaining an initial rotational speed of the first transmission component before the rotational speed synchronisation, and a final rotational speed of the first transmission component after the rotational speed synchronisation, and a time period for performing the rotational speed synchronisation,
   obtaining information relating to a level of the synchronisation torque applied to the first transmission component during the rotational speed synchronisation,
   obtaining information relating to a total moment of inertia associated with the first transmission component,
   determining the drag torque coefficient based on the obtained initial rotational speed, the obtained final rotational speed, the obtained time period, the level of the applied synchronisation torque and the total moment of inertia associated with the first transmission component.

2. The method according to claim 1, wherein the step of determining the drag torque coefficient involves using an equation having as terms the drag torque coefficient, the initial rotational speed of the first transmission component before the rotational speed synchronisation, the final rotational speed of the first transmission component after the rotational speed synchronisation, the time period for performing the rotational speed synchronisation, the level of applied synchronisation torque and the total moment of inertia associated with the first transmission component.

3. The method according to claim 1, wherein the step of determining the drag torque coefficient involves applying a Search Algorithm, in particular a Binary Search Algorithm, for identifying the drag torque coefficient.

4. The method according to claim 3, wherein applying the Binary Search Algorithm involves:
   a first step of setting a value of the drag torque coefficient equal to an initial drag torque coefficient value,
   a second step of calculating a value of a specified transmission term, the specified transmission term being selected from one of:
      initial rotational speed of the first transmission component,
      final rotational speed of the first transmission component,
      time period for performing the rotational speed synchronisation,
      level of synchronisation torque, and
      total moment of inertia associated with the first transmission component,
   based on an equation having as terms the drag torque coefficient, initial rotational speed of the first transmission component, final rotational speed of the first transmission component, time period for performing the rotational speed synchronisation, the obtained level of synchronisation torque and the obtained level of moment of inertia,
   a third step of calculating an error value equal to a difference between an obtained value of the selected one of the specified transmission term and the calculated value of the selected one specified transmission term,
   a fourth step of comparing the error value with an error margin and terminating the Binary Search Algorithm when the error value is smaller or equal to the error margin,
   a fifth step of comparing the obtained value of the selected one of the specified transmission term with the calculated value of the specified transmission term, adjusting the value of the drag torque coefficient accordingly, and keep repeating the second to fifth steps of the Binary Search Algorithm.

5. The method according to claim 3, wherein applying the Binary Search Algorithm involves:
   a first step of setting a value of the drag torque coefficient equal to an initial drag torque coefficient,
   a second step of calculating a final rotational speed of the first transmission component based on an equation having as terms also the drag torque coefficient, the obtained initial rotational speed of the first transmission component, the obtained time period for performing the rotational speed synchronisation, the obtained level of synchronisation torque and the obtained level of moment of inertia,
   a third step of calculating an error value equal to a difference between the obtained final rotational speed and the calculated final rotational speed,
   a fourth step of comparing the error value with an error margin and terminating the Binary Search Algorithm when the error value is smaller or equal to the error margin,
   a fifth step of comparing the obtained final rotational speed with the calculated final rotational speed, adjusting the value of the drag torque coefficient accordingly, and keep repeating the second to fifth steps of the Binary Search Algorithm.

6. The method according to claim 5,
   wherein the first step additionally includes setting an upper drag torque coefficient limit equal to an initial upper drag torque coefficient limit, setting a lower drag torque coefficient limit equal to an initial lower drag torque coefficient limit, and setting the initial drag torque coefficient within a range defined by the upper and lower drag torque coefficient limits, in particular at a centre of said range defined by the upper and lower drag torque coefficient limits, and
   wherein the fifth step involves comparing the obtained final rotational speed with the calculated final rotational speed, and
      when the obtained final rotational speed is smaller than the calculated final rotational speed during gear downshift, or when the obtained final rotational speed is larger than the calculated final rotational speed during gear upshift: setting the lower drag torque coefficient limit equal to the drag torque coefficient, and setting the drag torque coefficient equal to centre of range defined by the upper drag torque coefficient limit and the lower drag torque coefficient limit, and keep repeating the second to fifth steps of the Binary Search Algorithm, when the obtained final rotational speed is larger than the calculated final rotational speed during gear downshift, or when the obtained final rotational speed is smaller than the calculated final rotational speed during gear upshift: setting the upper drag torque coefficient limit equal to the drag torque coefficient, and setting the drag torque coefficient equal to centre of range defined by the upper drag torque coefficient limit and the lower drag torque coefficient limit, and keep repeating the second to fifth steps of the Binary Search Algorithm.

7. The method according to claim 4, wherein calculation of the final rotational speed in the second step of the Binary Search Algorithm is performed using the equation:

$$\omega_{f\_b_{mid}} = \frac{T}{b_{mid}} + \left[\omega_0 - \frac{T}{b_{mid}}\right] \times e^{-\frac{b_{mid} t_f}{J}},$$

wherein
$\omega_{f\_b_{mid}}$=calculated final rotational speed
$\omega_0$=initial rotational speed of the first transmission component
T=synchronisation torque
$b_{mid}$=drag torque coefficient
$t_f$=synchronisation time period
J=total moment of inertia associated with the first transmission component.

8. The method according to claim 3, wherein applying the Binary Search Algorithm involves:
a first step of setting a value of the drag torque coefficient equal to an initial drag torque coefficient,
a second step of calculating a time period for performing the rotational speed synchronisation based on an equation having as terms also the drag torque coefficient, the obtained initial rotational speed of the first transmission component, the obtained final rotational speed of the first transmission component, the obtained level of synchronisation torque and the obtained level of moment of inertia,
a third step of calculating an error value equal to a difference between the obtained time period for performing the rotational speed synchronisation and the calculated time period for performing the rotational speed synchronisation,
a fourth step of comparing the error value with an error margin and terminating the Binary Search Algorithm when the error value is smaller or equal to the error margin,
a fifth step of comparing the obtained time period for performing the rotational speed synchronisation with the calculated time period for performing the rotational speed synchronisation, adjusting the value of the drag torque coefficient accordingly, and keep repeating the second to fifth steps of the Binary Search Algorithm.

9. The method according to claim 8,
wherein the first step additionally includes setting an upper drag torque coefficient limit equal to an initial upper drag torque coefficient limit, setting a lower drag torque coefficient limit equal to an initial lower drag torque coefficient limit, and setting the initial drag torque coefficient within a range defined by the upper and lower drag torque coefficient limits, in particular at a centre of said range defined by the upper and lower drag torque coefficient limits, and wherein the fifth step involves comparing the obtained time period for performing the rotational speed synchronisation with the calculated time period for performing the rotational speed synchronisation, and when the obtained time period for performing the rotational speed synchronisation is smaller than the calculated time period for performing the rotational speed synchronisation during gear downshift, or when the obtained time period for performing the rotational speed synchronisation is larger than the calculated time period for performing the rotational speed synchronisation during gear upshift: setting the lower drag torque coefficient limit equal to the drag torque coefficient, and setting the drag torque coefficient equal to centre of range defined by the upper drag torque coefficient limit and the lower drag torque coefficient limit, and keep repeating the second to fifth steps of the Binary Search Algorithm, when the obtained time period for performing the rotational speed synchronisation is larger than the calculated time period for performing the rotational speed synchronisation during gear downshift, or when the obtained time period for performing the rotational speed synchronisation is smaller than the calculated time period for performing the rotational speed synchronisation during gear upshift: setting the upper drag torque coefficient limit equal to the drag torque coefficient, and setting the drag torque coefficient equal to centre of range defined by the upper drag torque coefficient limit and the lower drag torque coefficient limit, and keep repeating the second to fifth steps of the Binary Search Algorithm.

10. The method according to claim 8, wherein calculation of the final rotational speed in the second step of the Binary Search Algorithm is performed using the equation:

$$t_{f\_b_{mid}} = \frac{-J}{b_{mid}} \times \ln\left[\frac{\omega_f - \frac{T}{b_{mid}}}{\omega_0 - \frac{T}{b_{mid}}}\right],$$

wherein
$t_{f\_b_{mid}}$=calculated time period for performing the synchronisation
$\omega_0$=initial rotational speed of the first transmission component
T=synchronisation torque
$b_{mid}$=drag torque coefficient
$\omega_f$=final rotational speed of the first transmission component
J=total moment of inertia associated with the first transmission component.

11. The method according to claim 6, comprising setting the initial upper drag torque coefficient limit equal to synchronisation torque divided by obtained final rotational speed, and setting the initial lower drag torque coefficient limit equal to nil.

12. A method for controlling a rotational speed synchronisation of a transmission, the method comprising:
determining a drag torque coefficient of the transmission during a first rotational speed synchronisation according to the method defined in claim 1, calibrating a transmission control software based on the determined drag torque coefficient, and controlling a subsequent second rotational speed synchronisation of the transmission by means of the calibrated transmission control software.

13. The method according to claim 1, wherein the drag torque coefficient may be derived from the equation $T=J\omega+b\omega$ where J=total moment of inertia of a body, $\omega$=rotational speed of body and T=rotational torque applied to the body.

14. The method according to claim 1, wherein the drag torque coefficient may be determined from the following equation:

$$t_f = \ln\left[\frac{\omega_f - \left(\frac{T}{b}\right)}{\omega_0 - \left(\frac{T}{b}\right)}\right] \cdot \left(\frac{-J}{b}\right)$$

where:
b=drag torque coefficient,
$\omega_0$=the initial rotational speed of the first transmission component before the rotational speed synchronisation,
$\omega_f$=the final rotational speed of the first transmission component after the rotational speed synchronisation,
$t_f$=the time period for performing the rotational speed synchronisation,
T=the level of applied synchronisation torque, and
J=the total moment of inertia associated with the first transmission component.

15. A transmission system comprising:
a transmission including a first rotatable transmission component; and a controller configured to, upon performance of a rotational speed synchronisation involving application of a synchronisation torque to the first transmission component:

obtain an initial rotational speed of the first transmission component before the rotational speed synchronisation, and a final rotational speed of the first transmission component after the rotational speed synchronisation, and a time period for performing the rotational speed synchronisation, obtain information relating to a level of the synchronisation torque applied to the first transmission component during the rotational speed synchronisation, obtain information relating to a total moment of inertia associated with the first transmission component, and determine the drag torque coefficient based on the obtained initial rotational speed, the obtained final rotational speed, the obtained time period, the level of the applied synchronisation torque and the total moment of inertia associated with the first transmission component.

16. A drive train for a hybrid electric or electric vehicle, the drive train comprising the transmission system according to claim 15, and an electric propulsion motor drivingly connected with the transmission.

17. A vehicle comprising the transmission system according to claim 15.

18. A hybrid electric or electric vehicle comprising the drive train according to claim 16 and a plurality of driving wheels drivingly connected with the drive train.

* * * * *